US006788495B2

(12) United States Patent
Aiello (10) Patent No.: US 6,788,495 B2
(45) Date of Patent: Sep. 7, 2004

(54) DISC PACK ASSEMBLY (75) Inventor: Anthony J. Aiello, Aptos, CA (US)

(73) Assignee: Seagate Technology LLC, Scotts Valley, CA (US)

(*) Notice: Subject to any disclaimer, the term of this patent is extended or adjusted under 35 U.S.C. 154(b) by 55 days.

(21) Appl. No.: 10/215,852

(22) Filed: Aug. 9, 2002

(65) Prior Publication Data

US 2003/0169533 A1 Sep. 11, 2003

Related U.S. Application Data

(60) Provisional application No. 60/363,686, filed on Mar. 11, 2002.

(51) Int. Cl.$^7$ ............................................. G11B 17/02
(52) U.S. Cl. .................................................. 360/99.12
(58) Field of Search ........................... 360/98.08, 99.12

(56) References Cited

U.S. PATENT DOCUMENTS

| | | | |
|---|---|---|---|
| 3,587,073 A | 6/1971 | Ghose et al. ............. 340/174.1 |
| 3,587,074 A | 6/1971 | Angle et al. .............. 340/174.1 |
| 4,562,505 A | 12/1985 | Mroz .......................... 360/135 |
| 4,864,443 A | 9/1989 | Peterson .................... 360/99.12 |
| 4,971,646 A | 11/1990 | Schell et al. ........... 156/244.17 |
| 5,031,062 A | 7/1991 | Wood et al. .............. 360/98.08 |
| 5,058,926 A | 10/1991 | Drower ....................... 283/109 |
| 5,136,450 A | 8/1992 | Moir .......................... 360/135 |
| 5,249,090 A | * 9/1993 | Fehse ....................... 360/98.08 |
| 5,267,106 A | 11/1993 | Brue et al. ................ 360/98.08 |
| 5,295,030 A | 3/1994 | Tafreshi .................... 360/99.12 |
| 5,315,463 A | 5/1994 | Dew et al. ................ 360/98.08 |
| 5,331,488 A | 7/1994 | McAllister et al. ....... 360/98.08 |
| 5,367,418 A | 11/1994 | Chessman et al. ........ 360/99.12 |
| 5,384,677 A | 1/1995 | Morehouse et al. ...... 360/99.12 |
| 5,422,768 A | 6/1995 | Roehling et al. ......... 360/98.08 |
| 5,452,157 A | 9/1995 | Chow et al. .............. 360/98.08 |
| 5,457,589 A | 10/1995 | Leuthold et al. ......... 360/99.12 |
| 5,459,627 A | 10/1995 | Peter ........................ 360/98.08 |
| 5,459,628 A | 10/1995 | Brooks ..................... 360/99.08 |
| 5,490,024 A | 2/1996 | Briggs et al. ............. 360/99.12 |
| 5,493,462 A | 2/1996 | Peter ........................ 360/99.12 |
| 5,497,281 A | 3/1996 | Jewell et al. ............. 360/98.08 |
| 5,528,434 A | 6/1996 | Bronshvatch et al. .... 360/98.08 |
| 5,659,443 A | * 8/1997 | Berberich ................ 360/98.06 |
| 5,663,851 A | 9/1997 | Jeong et al. ............. 360/98.08 |
| 5,694,269 A | 12/1997 | Lee .......................... 360/98.08 |
| 5,712,746 A | 1/1998 | Moir et al. .............. 360/98.088 |
| 5,715,114 A | 2/1998 | Gotou ...................... 360/98.08 |
| 5,724,718 A | 3/1998 | Moir et al. ............... 29/603.03 |
| 5,731,928 A | 3/1998 | Jabbari et al. ........... 360/98.08 |
| 5,761,002 A | * 6/1998 | Moir et al. ............... 360/98.08 |
| 5,917,677 A | 6/1999 | Moir et al. ............... 360/99.12 |

(List continued on next page.)

OTHER PUBLICATIONS

Office Communication with Office Action Summary for Application No. 10/215,633, filing date Aug. 9, 2002, date mailed: Dec. 4, 2003.

Primary Examiner—A. J. Heinz
(74) Attorney, Agent, or Firm—Westman, Champlin & Kelly (57) ABSTRACT

A disc pack assembly for use in a disc drive storage system or external servo writer that is configured to maintain concentric alignment between one or more discs and a hub during handling. The disc pack assembly generally includes a disc support having an annular shoulder, a disc supported on the annular shoulder, and a hub top. The hub top includes a spindle mount portion, a ring mount portion and an annular clamping flange. The spindle mount portion is mountable to a rotatable spindle of a motor of a disc drive or an external servo writer. The ring mount portion is positioned in interference-fit engagement with the disc support for attachment thereto. The annular clamping flange applies an axial force to the disc to secure the disc between the clamping flange and the annular shoulder.

29 Claims, 4 Drawing Sheets

U.S. PATENT DOCUMENTS

| | | |
|---|---|---|
| 5,940,244 A | 8/1999 | Canlas et al. ............. 360/98.08 |
| 5,943,184 A | 8/1999 | Kelsic et al. ............. 360/98.08 |
| 6,041,488 A | 3/2000 | Wang ....................... 29/603.03 |
| 6,172,844 B1 | 1/2001 | Luo et al. ................. 360/98.08 |
| 6,178,063 B1 | 1/2001 | Wood et al. ............. 360/98.08 |
| 6,195,234 B1 | 2/2001 | Sundaram et al. ........... 360/135 |
| 6,212,030 B1 | 4/2001 | Koriyama et al. ....... 360/98.08 |
| 6,226,146 B1 | 5/2001 | Landess et al. .......... 360/98.08 |
| 6,252,738 B1 | 6/2001 | Slezak ..................... 360/98.08 |
| 6,285,527 B1 | 9/2001 | Kennedy et al. ......... 360/99.08 |
| 6,366,427 B1 | 4/2002 | West ....................... 360/99.12 |
| 6,369,970 B1 | 4/2002 | Steinhoff et al. .............. 360/75 |
| 6,501,617 B1 * | 12/2002 | Harada et al. ........... 360/99.08 |
| 6,594,109 B2 * | 7/2003 | Renken ................... 360/98.08 |
| 6,603,636 B2 * | 8/2003 | Schwandt et al. ....... 360/99.12 |
| 2003/0169533 A1 | 9/2003 | Aiello ..................... 360/98.08 |

\* cited by examiner

DISC PACK ASSEMBLY

CROSS-REFERENCE TO RELATED APPLICATION

The present invention claims priority from U.S. Provisional Application No. 60/363,686 filed on Mar. 11, 2002 for inventor Anthony J. Aiello and entitled "SPINDLE HUB AND DISC PACK CARTRIDGE ASSEMBLY."

FIELD OF THE INVENTION

The present invention relates generally to a disc pack assembly for use in disc drive storage systems and external servo writers, and more particularly but not by limitation, to a disc pack assembly that can be assembled outside of the disc drive or servo writer and is configured to maintain concentric alignment between one or more discs and a hub during handling.

BACKGROUND OF THE INVENTION

Modern computers employ various forms of storage systems for storing programs and data. These storage systems include disc drive systems that operate under the control of a computer to record information and/or retrieve recorded information on one or more recording discs. Such disc drives include hard disc drives which employ recording discs that have magnetizable recording material, optical disc drives which employ recording discs that have optically readable recording material, magneto-optical disc drives which employ recording discs that have optically readable magnetizable recording material, and the like.

Conventional disc drive systems typically include one or more recording discs (disc stack) supported for high speed rotation on a rotary spindle that is driven by a motor. The spindle can be a rotatable shaft, or sleeve surrounding a shaft, of a fluid dynamic bearing cartridge, for example. The rotatable spindle defines the core of the stack, is cylindrical in shape and serves to align the disc or discs around a common axis. Reading and/or writing heads are positioned adjacent surfaces of the discs for reading data from and/or writing data to circular concentric data tracks.

A disc clamp is used to secure the disc or discs to the spindle. To assure that proper registration of the discs for reading and writing purposes can be achieved, the disc clamp must secure the discs to the spindle to prevent them from dislodging and moving in the axial or radial direction once mounted to the spindle. Thus, the discs must be protected from non-operational shocks that can occur during handling of the disc drive, installation of the disc drive into a computer, and during transport and use of the computer. Additionally, it is desirable that the discs be mounted without deforming the discs, which may adversely affect the reading and writing performance of the heads. Finally, it is desirable that the height required by the disc clamp to mount the discs to the spindle be minimized to meet the never-ending demands for smaller and shorter disc drives.

Current systems utilize a disc clamp to secure the discs in place on the spindle. Conventional disc clamps are available in various configurations. One known type of disc clamp uses screws passed through a circular plate and into tapped openings in the spindle to provide the clamping force that secures the discs in place. Unfortunately, the circular plate and screws undesirably add height to the disc stack. In addition, the individual screws produce localized stresses in the discs, which may undesirably distort the shape of the disc.

A second known type of disc clamp includes a bell-shaped part that operates as a spring. Typically, screws are passed through openings in the center of the bell-shaped part and into a tapped opening in the spindle. Unfortunately, this design requires substantial spindle height. In addition, attaching the screws at the center of the spindle causes the bell-shaped part to flatten as the screws are tightened. The edges of the bell-shaped part which contact the disc during tightening move across the surface of the disc in a radially outward direction. The movement of the disc clamp with respect to the disc causes the disc to undesirably distort into a conical shape, and produces a radial load on the disc.

A third known type of disc clamp is a heat-shrink ring which is attached to the top of the hub without the use of screws. This type of disc clamp is often referred to as a shrink-fit disc clamp. A ring is heated so that it expands and the inner diameter of the ring is greater than the outer diameter of the hub. A tool is then used to transfer the heated ring to the top of the disc stack and to apply a clamping force to the heated ring. The clamping force is maintained on the ring as it cools resulting in the application of a substantially uniform axial load to the discs. Unfortunately, mounting of the discs to the drive using such a shrink-fit disc clamp can be complicated and problems with slippage of the ring on the spindle can arise.

As mentioned above, the discs used in disc drives generally include circular data tracks which extend circumferentially around each disc. The boundaries and centerlines of each data track are defined by radially extending servo tracks that contain servo information. Disc drives utilize servo systems to control the position of a read/write head relative to the data tracks using the servo information stored in the servo tracks. As a head moves over a surface of a disc, the head reads the servo information and produces an output signal that indicates its position relative to the servo tracks. The output signal is demodulated and compared with a reference position signal relating to a desired head position to produce a position error signal (PES). The PES is provided to a servo controller that produces a control signal which is used to control an actuator mechanism of the disc drive or spin-stand to move the head toward a desired data track. Once the head is positioned over the desired data track, the servo system allows the head to follow the track using the servo information.

The servo tracks are typically written after the discs have been mounted to the spindle of the disc drive using the disc clamp. These "post-written" tracks are substantially concentric with the axis of rotation of the disc on which they are written, since the axis of rotation remains constant from when the servo information is written to when the servo information is used to perform track following. However, uncontrolled factors such as bearing tolerances, spindle resonances, displacement of the disc due to non-operational shocks, and the like, tend to introduce errors in the location of the servo information. As a result, each track is typically not perfectly concentric with the axis of rotation of the disc, but rather exhibits certain random, repeatable variations which are sometimes referred to as repeatable runout (RRO). This slight misalignment is exhibited in a periodic PES, which can be compensated for using conventional techniques.

There is a continuing trend in the disc drive industry to provide successive generations of disc drive products with ever increasing data storage capacities and data transfer rates. Because the amount of disc surface available for the recording of data remains substantially constant (or even decreases as disc drive form factors become smaller), substantial advancements in areal recording densities, both in terms of the number of bits that can be recorded on each track as well as the number of tracks on each disc (measured as tracks per inch or TPI), are continually being made in order to facilitate such increases in data capacity. One way to improve storage capacities is to improve the writing of the servo patterns on the discs.

To that end, servo information is written on the discs prior to their installation in a disc drive using highly precise servo writers. These "pre-written" tracks can result in a potential increase in the TPI of the disc. Unfortunately, disc drives incorporating discs having these pre-written tracks cannot realize an increase in recording capacity because the encountered RRO is too large to be compensated for using standard techniques. The large RRO is the result of a tremendous eccentricity that exists between the data tracks and the new axis of rotation of the discs that have been installed in the disc drive using conventional disc clamping methods, such as those discussed above.

There exists a never-ending demand for improvements to disc drives performance. To that end, it would be desirable to provide a disc pack assembly that provides substantially uniform axial clamping loads to the discs while avoiding the problems of the prior art mentioned above.

SUMMARY OF THE INVENTION

The present invention relates to a disc pack assembly for use in a disc drive storage system or external servo writer that is configured to maintain concentric alignment between one or more discs and a hub during handling. The disc pack assembly generally includes a disc support having an annular shoulder, a disc supported on the annular shoulder, and a hub top. The hub top includes a spindle mount portion, a ring mount portion and an annular clamping flange. The spindle mount portion is mountable to a rotatable spindle of a motor of a disc drive or an external servo writer. The ring mount portion is positioned in interference-fit engagement with the disc support for attachment thereto. The annular clamping flange applies an axial force to the disc to secure the disc between the clamping flange and the annular shoulder.

The present invention facilitates the assembly or partial assembly of the disc pack outside of a disc drive or an external servo writer while providing concentric alignment between one or more discs and a hub during handling. Due to this configuration, the disc pack assembly can have discs with pre-written servo tracks that, when mounted to a spindle of a disc drive, are more concentrically aligned with the axis of rotation of the spindle as compared to when prior art clamping methods are used to mount the pre-written discs to the spindle of the disc drive.

Other features and benefits that characterize embodiments of the present invention will be apparent upon reading the following detailed description and review of the associated drawings.

DETAILED DESCRIPTION OF ILLUSTRATIVE EMBODIMENTS

The present invention is directed to a disc pack assembly that is configured to support one or more discs in concentric alignment with a hub independent of an installation into a disc drive or servo writer while preventing radial and axial displacement of the discs when the disc pack assembly is jostled or jarred. The hub of the disc pack assembly can be concentrically mounted to a rotatable spindle of external servo writers and disc drives. This allows the servo tracks to be written by a servo writer prior to their installation into the disc drive while avoiding the large RRO associated with prior art clamping methods. Finally, the disc pack assembly of the present invention is also easily assembled through interference-fit engagement of primary components. Although the following discussion depicts the mounting of the disc pack assembly to a spindle of a disc drive motor, the disc pack assembly of the present invention can be similarly mounted to spindles of other motors such as that of external servo writers.

Figure 1:
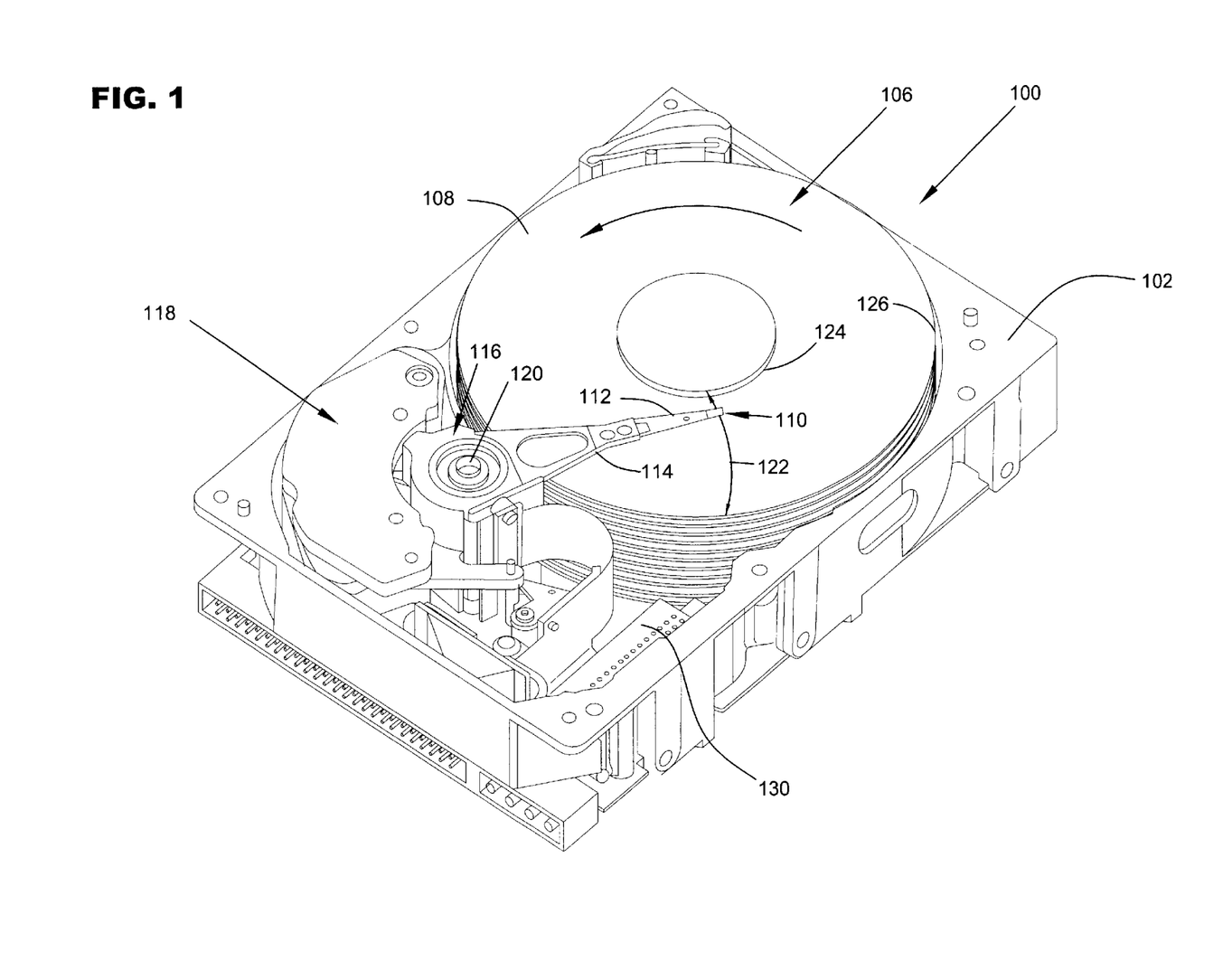
FIG. 1 is an isometric view of a disc drive including a disc pack assembly in accordance with an embodiment of the invention.

FIG. 1 is an isometric view of a disc drive 100 with which embodiments of the present invention are useful. Disc drive 100 includes a housing with a base 102 and a top cover (not shown). Disc drive 100 further includes a disc pack assembly 106 in accordance with the present invention that is configured to mount one or more discs 108 to a spindle of a motor (not shown) for co-rotation therewith. Embodiments of disc pack assembly 106 will be discussed in detail below. Each disc has at least one associated disc head slider 110 which is configured to perform reading and writing operations on the adjacent disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 in response to servo tracks written on the disc surfaces and a host computer (not shown).

Figure 2:
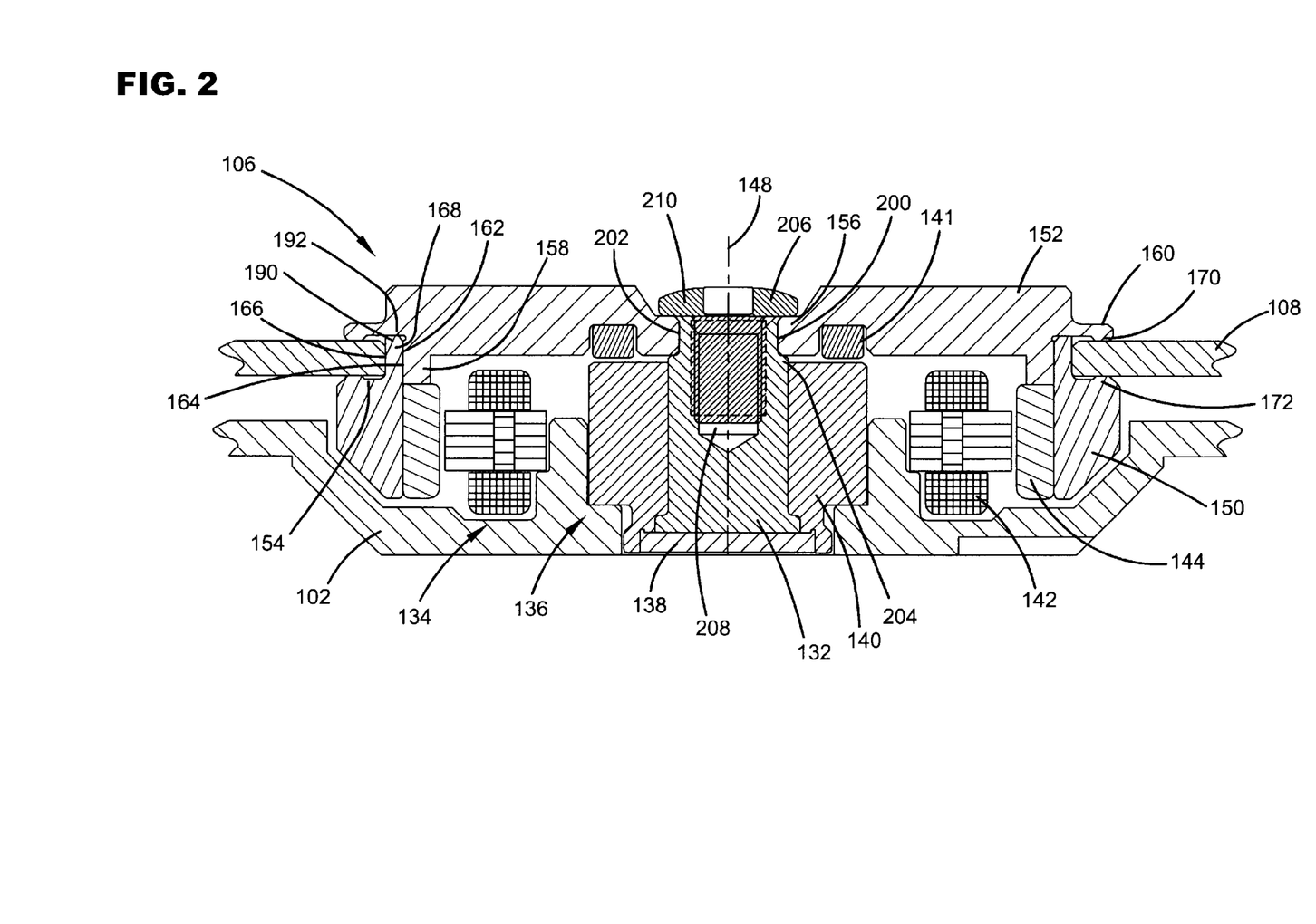
FIG. 2 is a side cross-sectional view of a disc pack assembly mounted to a spindle of a disc drive motor, in accordance with an embodiment of the invention.

FIG. 2 is a side cross-sectional view of an embodiment of disc pack assembly 106 concentrically mounted to a spindle 132 of a disc drive motor 134, in accordance with one possible configuration. Disc drive motor 134 includes a stationary fluid dynamic bearing cartridge 136 that includes spindle 132 mounted to counter plate 138, and a stationary sleeve 140 surrounding rotatable spindle 132. Preferably, the inside diameter of sleeve 140 is greater than the outside diameter of spindle 132 so as to create a clearance between spindle 132 and sleeve 140, which is filled with a lubricating fluid that is used to form a hydrodynamic bearing. A permanent magnet ring 141 is attached to disc pack assembly 106 to pull it toward sleeve 140 and maintain spindle 132 within bearing cartridge 136. Motor 134 includes stator assembly 142 coupled to base structure 102 and permanent magnet ring 144 attached to disc pack assembly 106. Permanent magnet ring 144 is radially spot magnetized in alternating polarity and equally spaced circumferential positions thereby defining a number of permanent magnet poles. Interaction between stator assembly 142 and the magnet 144 causes disc pack assembly 106 and spindle 132 to rotate about axis of rotation 148.

Those skilled in the art understand that disc pack assembly 106 can be mounted to other rotatably driven components of motors of disc drives and external servo writers. For example, disc pack assembly 106 can be mounted to a rotatable sleeve of a stationary shaft fluid dynamic bearing as opposed to the depicted rotational shaft fluid dynamic bearing of FIG. 2. Accordingly, the use of the term "spindle" herein is intended to describe the rotationally driven component of the motor to which disc pack assembly 106 is mounted.

Disc pack assembly 106 includes a disc support 150 and a hub top 152. Disc support 150 is an annular member to which magnet ring 144 is attached. Disc support 150 includes an annular shoulder 154 on which one or more discs 108 are supported. Hub top 152 includes a spindle mount portion 156, a ring mount portion 158, and an annular clamping flange 160. Spindle mount portion 156 is adapted to attach to spindle 132 for co-rotational movement therewith. Additionally, spindle mount portion 156 is preferably configured to assist in concentrically aligning disc 108 with axis of rotation 148 such that eccentricity between pre-written servo tracks on disc 108 and axis of rotation 148 is minimized. Ring mount portion 158 has an outer diameter 162 that engages an inner diameter 164 of disc support 150 for an interference-fit engagement therewith. This interference-fit engagement couples hub top 152 to disc support 150 in a secure manner.

Disc 108 includes a central opening defined by interior edge 166. The disc support 150 includes a hub portion 168 that extends in an axial direction from a top surface of annular shoulder 154 through the central opening. The outer diameter of hub portion 168 is sized to accommodate the central opening of disc 108 with very little gap therebetween. Hub portion 168 can be extended for support of multiple discs 108, as will be discussed below.

Disc support 150 is preferably formed of magnetic steel and hub top 152 is preferably formed of metal. These components are generally formed using conventional machining processes. One advantage of the present invention is the location of critical surfaces of disc support 150 and hub top 152. For hub top 152, these critical surfaces include outer diameter 162 of ring mount portion 158, the bottom surface of clamping flange 160, and spindle mount portion 156. For disc support 150, these critical surfaces include inner diameter 164, the outer diameter of hub portion 168, and annular shoulder 154. By placing these critical surfaces on single side for each component, they can be formed at the same time without having to re-chuck the component in, for example, a lathe that is used to form the component. This allows these critical surfaces to be formed with greater precision than would be possible if it was necessary to re-chuck the component to perform a secondary machining operation on surfaces located on a second side.

When assembled, clamping flange 160 of disc pack assembly 106 is configured to apply an axial force to the disc 108, which is counterbalanced by an opposing force that is applied at annular shoulder 154 of disc support 150 and is maintained due to the interference-fit between disc support 150 and hub top 152. As a result, a compressive axial clamping force pinches disc 108 between clamping flange 160 and annular shoulder 154. In this manner, disc 108 is prevented from moving axially and radially relative to disc support 150 and hub top 152. Additionally, frictional resistance between top and bottom surfaces of disc 108 and clamping flange 160 and annular shoulder 154, respectively, prevents rotational movement of disc 108 relative to disc support 150 and hub top 152. The application of the clamping force at the perimeter of disc pack assembly 106, allows hub top 152 to be formed thinner than prior art disc clamps that generate the clamping force at the spindle. As a result, hub top 152 is not subjected to forces that could cause it to become deformed, which could in turn undesirably affect the axial position of disc 108.

The clamping force that is applied to disc 108 is controlled, in part, by shoulder portion 190 of hub top 152 that engages a top surface 192 of hub portion 168 of disc support 150. Additionally, clamping flange 160 acts as a spring and deflects slightly in an axial direction when disc pack assembly 106 is assembled to further control the magnitude of the clamping force and ensure its uniform application to disc 108.

In accordance with one embodiment of the invention, clamping flange 160 and annular shoulder 154 include raised portions 170 and 172, respectively, at which the clamping force is applied. Raised portions 170 and 172 are preferably annular and are substantially aligned in an axial direction. The disc-engaging portions of raised portions 120 and 122 preferably have a circular or trapezoidal cross-sectional shape. One advantage to applying the axial force at raised portion 170 of clamping flange 160 is that good contact is maintained with the top surface of disc 108 as clamping flange 160 flexes in the axial direction.

Figure 3:
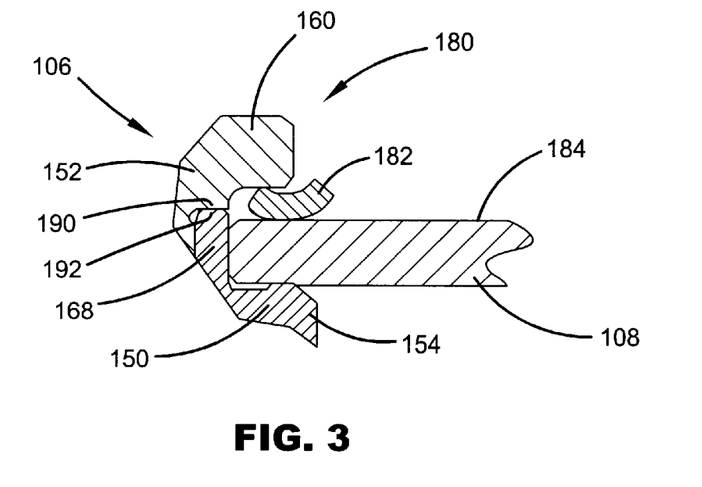
FIG. 3 is a side cross-sectional view of a disc clamping region of a disc pack assembly in accordance with an embodiment of the invention.

FIG. 3 is an enlarged side cross-sectional view of a clamping region 180 of disc pack assembly 106 where the clamping force is applied. In accordance with one embodiment, clamping flange 160 is formed as a more rigid member than that depicted in FIG. 2 and applies the axial force to disc 108 through a clamping ring 182. Clamping ring 182 is preferably a compressible annular member that is placed adjacent the central opening of disc 108 prior to press-fitting hub top 152 to disc support 150. As disc support 150 and hub top 152 are press-fit together, clamping ring 182 is compressed between a top surface 184 of disc 108 and a bottom surface of clamping flange 160 resulting in the application of the substantially uniform clamping force to disc 108. In accordance with one embodiment, clamping ring 182 has a curved, preferably U-shaped, cross-section that maintains good contact with top surface 184 of disc 108 as clamping ring 182 is compressed. Clamping ring 182 can also take on other forms and have other cross-sectional shapes.

Figure 4:
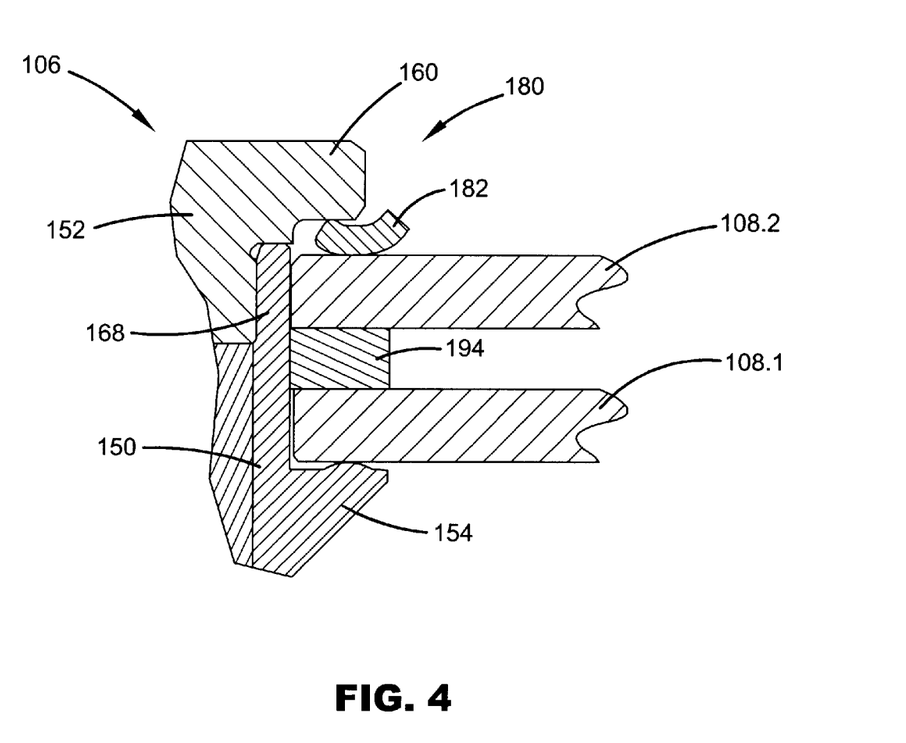
FIG. 4 is a side cross-sectional view of a disc clamping region of a disc pack assembly illustrating the support of a plurality of discs in accordance with an embodiment of the invention.

FIG. 4 is a side cross-sectional view of a clamping region 180 of another embodiment of disc pack assembly 106 that provides multiple disc support. Here, clamping flange 160 applies the axial force to bottom disc 108.1 through at least one other disc 108.2 and a spacer member 194. Although depicted as using clamping ring 182, the clamping method depicted in FIG. 2 can be used as well. Spacer member 194 creates a gap between adjacent discs 108.1 and 108.2. Spacer member 194 can be an annular spacer ring and can have the depicted square cross-sectional shape, or any other suitable cross-sectional shape. Although FIG. 4 depicts the support of only two discs, it should be understood that disc pack assembly 106 can be configured to support additional discs by further extending hub portion 168 and providing additional spacer members 194 between adjacent discs.

As mentioned above, hub top 152 includes a spindle mount portion 156 that is configured to mount to spindle 132 after disc pack assembly 106 is assembled. In accordance with the embodiment depicted in FIG. 2, spindle mount portion 156 is defined by a central opening 200 that is sized to receive an exterior surface 202 of spindle 132. Central opening 200 of spindle mount portion 156 is preferably sized to provide interference-fit engagement with exterior surface 202 of spindle 132. This encourages concentric alignment between the axis of rotation 148 of spindle 132 and pre-written servo tracks on disc or discs of disc pack assembly 106. In accordance with one embodiment, spindle 132 includes an annular shoulder 204 having an outer diameter that is slightly greater than the inner diameter of central opening 200 of spindle mount portion 156 and provides support of hub top 152. Hub top 152 is preferably secured to spindle 132 using a screw 206 that is received by a threaded bore 208 of spindle 132. Screw 206 includes an annular shoulder 210 that pinches spindle mount portion 156 against annular shoulder 204 of spindle 132 to thereby secure disc pack assembly to spindle 132. This arrangement allows screw 206 to be positioned substantially lower than screws used in prior art disc clamps where the disc clamp is positioned between the screw and the hub web portion. Alternatively, an adhesive could be applied between exterior surface 202 of spindle mount portion 156 and spindle 132 to attach disc pack assembly 106 to spindle 132.

Figure 5:
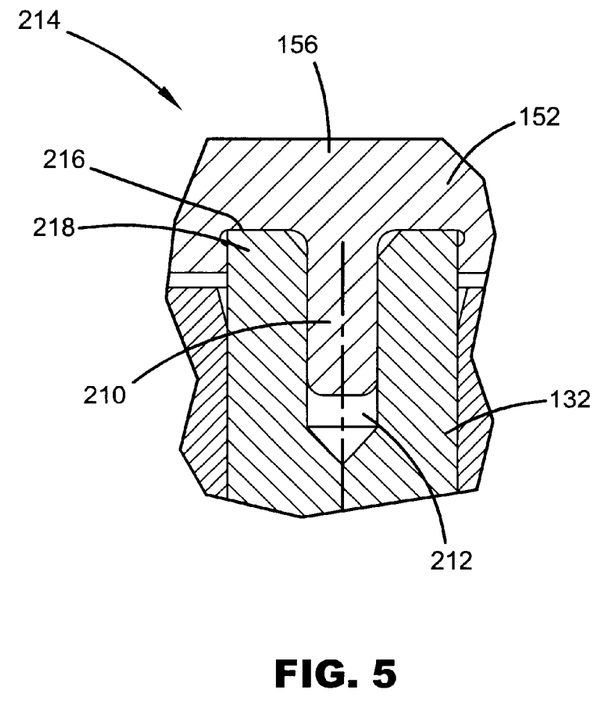
FIG. 5 is a side cross-sectional view of a spindle mount portion of a disc pack assembly mounted to a spindle in accordance with an embodiment of the invention.

In accordance with another embodiment of the invention, spindle mount portion 156 includes a protrusion 210 that extends into a bore 212 of spindle 132, as shown in the enlarged side cross-sectional view of a spindle mount region 214 of FIG. 5. Protrusion 210 is preferably a cylindrical member that is concentrically aligned with the disc support 150, disc 108 and hub top 152. Protrusion 210 is preferably sized for interference-fit engagement with bore 212 of spindle 132 to allow for the press-fit attachment of disc pack assembly 106 thereto and to ensure concentric alignment between disc pack assembly 106 and axis of rotation 148 (FIG. 2) of spindle 132. An adhesive can be applied to protrusion 210 if necessary to prevent relative axial movement between disc pack assembly 106 and spindle 132 where a slight clearance (e.g., 0.1 mm) exists between bore 212 of spindle 132 and protrusion 210. Spindle mount portion 156 can also include an annular channel 216 that is adapted to receive a top portion 218 of spindle 132 to further secure disc pack assembly 106 to spindle 132. Annular channel 216 is preferably sized to provide an interference-fit engagement with top portion 218 of spindle 132. An adhesive can also be applied between annular channel 216 and top portion 218 of spindle 132 to provide additional resistance to relative axial and rotational movement between disc pack assembly 106 and spindle 132. Other methods of joining hub top 152 at disc pack assembly 106 to spindle 132 can also be used such as a pin-in-hole adhesive joint, a press-fit pin joint, and other suitable fastening techniques.

Alternatively described, the present invention is directed to a disc pack assembly (such as 106) for mounting to a rotatable spindle (such as 132) of a motor (such as 134) of a disc drive (such as 100) or a servo writer. The disc pack assembly (such as 106) includes a disc support (such as 150) having an annular shoulder (such as 154), a disc (such as 108) supported on the annular shoulder, and a hub top (such as 152) having a spindle mount portion (such as 156) that is mountable to the rotatable spindle. The hub top also includes a ring mount portion (such as 158) in interference-fit engagement with a disc support and an annular clamping flange (such as 160) that is configured to apply an axial force to the disc. The clamping flange can directly engage the disc, apply the axial force to the disc through at least one other disc (such as 108.2) and a spacer member (such as 194) separating the disc, or apply the axial force to the disc through a clamping ring (such as 182). The spindle mount portion can include a protrusion (such as 210) that is sized to provide interference-fit engagement with a receiver (such as 212) of the spindle, or have a central opening (such as 200) that is sized to receive an exterior surface (such as 202) of the spindle.

The present invention is also directed to a disc drive that includes a rotatable spindle (such as 132), a motor (such as 134) configured to rotate the spindle, and the above-described disc pack assembly.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A disc pack assembly for mounting to a rotatable spindle of a motor of disc drive or servo writer comprising:
   a disc support having an annular shoulder;
   a disc supported on the annular shoulder; and
   a hub top having a spindle mount portion mountable to the rotatable spindle, a ring mount portion in interference-fit engagement with the disc support, and an annular clamping flange configured to apply an axial force to the disc.

2. The disc pack assembly of claim 1, wherein the clamping flange engages the disc.

3. The disc pack assembly of claim 1, wherein the clamping flange applies the axial force to the disc through at least one other disc and a spacer member separating the discs.

4. The disc pack assembly of claim 1 including a clamping ring engaging the annular clamping flange of the hub top, whereby the axial force is applied to the disc through at least the clamping ring.

5. The disc pack assembly of claim 4, wherein the clamping ring has a curved cross-section.

6. The disc pack assembly of claim 1, wherein the spindle mount portion includes a protrusion that is receivable by the spindle for attachment thereto.

7. The disc pack assembly of claim 6, wherein the protrusion is sized to provide interference-fit engagement with a receiver of the spindle.

8. The disc pack assembly of claim 1, wherein the spindle mount portion is defined by a central opening that is sized to receive an exterior surface of the spindle.

9. The disc pack assembly of claim 8, wherein the central opening is sized to provide interference-fit engagement with the exterior surface of the spindle.

10. The disc pack assembly of claim 1, wherein:
    the annular shoulder includes at least one raised portion extending from a top surface; and
    the clamping flange includes at least one raised portion extending from a bottom surface through which the axial force is applied to the disc.

11. The disc pack assembly of claim 10, wherein the raised portions of the annular shoulder and the clamping flange are substantially aligned in an axial direction.

12. The disc pack assembly of claim 10, wherein portions of the raised portions have a circular or trapezoidal cross-sectional shape.

13. The disc pack assembly of claim 1, wherein:
the disc includes an interior edge defining a central opening; and
the disc support includes a hub portion extending in an axial direction from a top surface of the annular shoulder through the central opening.

14. A disc pack assembly for mounting to a rotatable spindle of a disc drive or servo writer comprising:
a disc support having an annular shoulder;
a plurality of discs including a top disc and a bottom disc, each disc separated from adjacent discs by a spacer member, the bottom disc supported on the annular shoulder; and
a hub top having a spindle mount portion mountable to the spindle, a ring mount portion in interference-fit engagement with the disc support, and an annular clamping flange, whereby a compressive axial force is applied to the discs by the annular clamping flange and annular shoulder.

15. The disc pack assembly of claim 14, wherein the clamping flange engages the top disc.

16. The disc pack assembly of claim 14 including a clamping ring sandwiched between the annular clamping flange of the hub top and the top disc.

17. The disc pack assembly of claim 16, wherein the clamping ring has a curved cross-section.

18. The disc pack assembly of claim 14, wherein the spindle mount portion includes a protrusion that is receivable by the spindle for attachment thereto.

19. The disc pack assembly of claim 18, wherein the protrusion is sized to provide interference-fit engagement with a receiver of the spindle.

20. The disc pack assembly of claim 14, wherein the spindle mount portion is defined by a central opening that is sized to receive an exterior surface of the spindle.

21. The disc pack assembly of claim 20, wherein the central opening is sized to provide interference-fit engagement with the exterior surface of the spindle.

22. The disc pack assembly of claim 14, wherein:
the annular shoulder includes at least one raised portion extending from a top surface; and
the clamping flange includes at least one raised portion extending from a bottom surface, whereby the compressive axial force is applied to the discs at the disc-engaging portions of the annular shoulder and clamping flange.

23. The disc pack assembly of claim 22, wherein the raised portions of the annular shoulder and the clamping flange are substantially aligned in an axial direction.

24. The disc pack assembly of claim 22, wherein portions of the raised portions have a circular or trapezoidal cross-sectional shape.

25. The disc pack assembly of claim 14, wherein:
the disc includes an interior edge defining a central opening; and
the disc support includes a hub portion extending in an axial direction from a top surface of the annular shoulder through the central opening.

26. A disc drive comprising:
a rotatable spindle;
a motor configured to rotate the spindle; and
a disc pack assembly comprising:
a disc support having an annular shoulder;
a disc supported on the annular shoulder; and
a hub top having a spindle mount portion mountable to the rotatable spindle, a ring mount portion in interference-fit engagement with the disc support, and an annular clamping flange, whereby a compressive axial force is applied to the disc through the annular shoulder and the annular clamping flange.

27. A method of assembling a disc drive comprising steps of:
(a) providing a disc drive subassembly including a base, a motor mounted to the base, and a spindle rotatable by the motor;
(b) assembling a disc pack assembly comprising steps of:
(b)(1) positioning a disc on an annular shoulder of a disc support; and
(b)(2) press-fitting a ring mount portion of a hub top to the disc support for interference-fit engagement therebetween, the hub top including an annular clamping flange, whereby a compressive axial force is applied to the disc between the annular shoulder and the annular clamping flange; and
(c) attaching a spindle mount portion of the hub top to the spindle.

28. A disc pack assembly for use in a disc drive comprising:
a disc support having an annular shoulder;
a disc supported on the annular shoulder at a bottom surface; and
a hub top having a means for providing interference-fit attachment to the disc support and applying a compressive axial force to the disc.

29. The assembly of claim 28, wherein the hub top includes a ring mount portion in interference-fit engagement with the disc support, and an annular clamping flange configured to apply an axial force to the disc.

* * * * *

UNITED STATES PATENT AND TRADEMARK OFFICE
CERTIFICATE OF CORRECTION

PATENT NO. : 6,788,495 B2 Page 1 of 1
DATED : September 7, 2004
INVENTOR(S) : Anthony J. Aiello It is certified that error appears in the above-identified patent and that said Letters Patent is hereby corrected as shown below:

Title page,
Item [54], Title, delete "DISC PACK ASSEMBLY" and insert -- DISC PACK ASSEMBLY USING INTERFERENCE-FIT BETWEEN DISC SUPPORT AND HUB TOP TO RETAIN DISC --

Signed and Sealed this

Twenty-third Day of November, 2004

JON W. DUDAS
*Director of the United States Patent and Trademark Office*